US007012562B2

(12) United States Patent
Ikeda

(10) Patent No.: US 7,012,562 B2
(45) Date of Patent: Mar. 14, 2006

(54) PULSE WAVE RADAR DEVICE

(75) Inventor: Hiroshi Ikeda, Tokyo (JP)

(73) Assignee: TDK Corporation, Tokyo (JP)

( * ) Notice: Subject to any disclaimer, the term of this patent is extended or adjusted under 35 U.S.C. 154(b) by 45 days.

(21) Appl. No.: 10/992,724

(22) Filed: Nov. 22, 2004

(65) Prior Publication Data

US 2005/0134502 A1    Jun. 23, 2005

(30) Foreign Application Priority Data

Dec. 22, 2003    (JP) ............................. 2003-424874

(51) Int. Cl.
  *G01S 13/87*    (2006.01)
  *G01S 7/28*    (2006.01)
(52) U.S. Cl. .................. 342/159; 342/27; 342/28; 342/60; 342/70; 342/118; 342/134; 342/175
(58) Field of Classification Search ............ 342/13–20, 342/27, 28, 42–45, 60, 61, 70–72, 89–103, 342/118, 127, 128–146, 159, 165–175, 195
See application file for complete search history.

(56) References Cited

U.S. PATENT DOCUMENTS

| 3,858,205 | A | * | 12/1974 | Ross ........................... 342/72 |
| 4,156,874 | A | * | 5/1979 | Kopis .......................... 342/71 |
| 4,458,246 | A | | 7/1984 | Filipsson et al. |
| 4,717,917 | A | | 1/1988 | Alitz et al. |
| 5,220,331 | A | * | 6/1993 | Gunter ......................... 342/70 |
| 5,497,162 | A | | 3/1996 | Kaiser et al. |
| 5,724,041 | A | * | 3/1998 | Inoue et al. .................. 342/70 |
| 5,923,280 | A | * | 7/1999 | Farmer ........................ 342/70 |
| 5,955,985 | A | * | 9/1999 | Kemkemian et al. ....... 342/159 |
| 6,028,548 | A | * | 2/2000 | Farmer ........................ 342/70 |
| 6,094,160 | A | * | 7/2000 | Lajiness ...................... 342/70 |
| 6,618,003 | B1 | * | 9/2003 | Voigtlaender et al. ...... 342/159 |
| 6,693,581 | B1 | * | 2/2004 | Gottwald et al. ............. 342/70 |
| 6,693,582 | B1 | * | 2/2004 | Steinlechner et al. ......... 342/70 |
| 2002/0198632 | A1 | | 12/2002 | Breed et al. |

FOREIGN PATENT DOCUMENTS

| DE | 1811622 | 6/1970 |
| DE | 2808544 | 8/1979 |
| DE | 2808545 | 8/1979 |
| DE | 3135231 | 4/1983 |
| DE | 4442189 | 5/1996 |
| DE | 19600802 | 7/1996 |
| EP | 0676650 | 10/1995 |
| WO | WO 02/061454 | 8/2002 |

OTHER PUBLICATIONS

Patent Abstracts of Japan, JP 2002-277541, Sep. 25, 2002 (with partial English Translation).

* cited by examiner

*Primary Examiner*—Bernarr E. Gregory
(74) *Attorney, Agent, or Firm*—Oblon, Spivak, McClelland, Maier & Neustadt, P.C.

(57) ABSTRACT

A pulse wave radar device transmits at a constant period a transmitting signal in which identification data for identifying of pulse wave radar devices is added to a distance-measuring signal so that any other pulse wave radar device can identify a receiving wave reflected by a target owing to a transmitting wave that itself has transmitted.

9 Claims, 9 Drawing Sheets

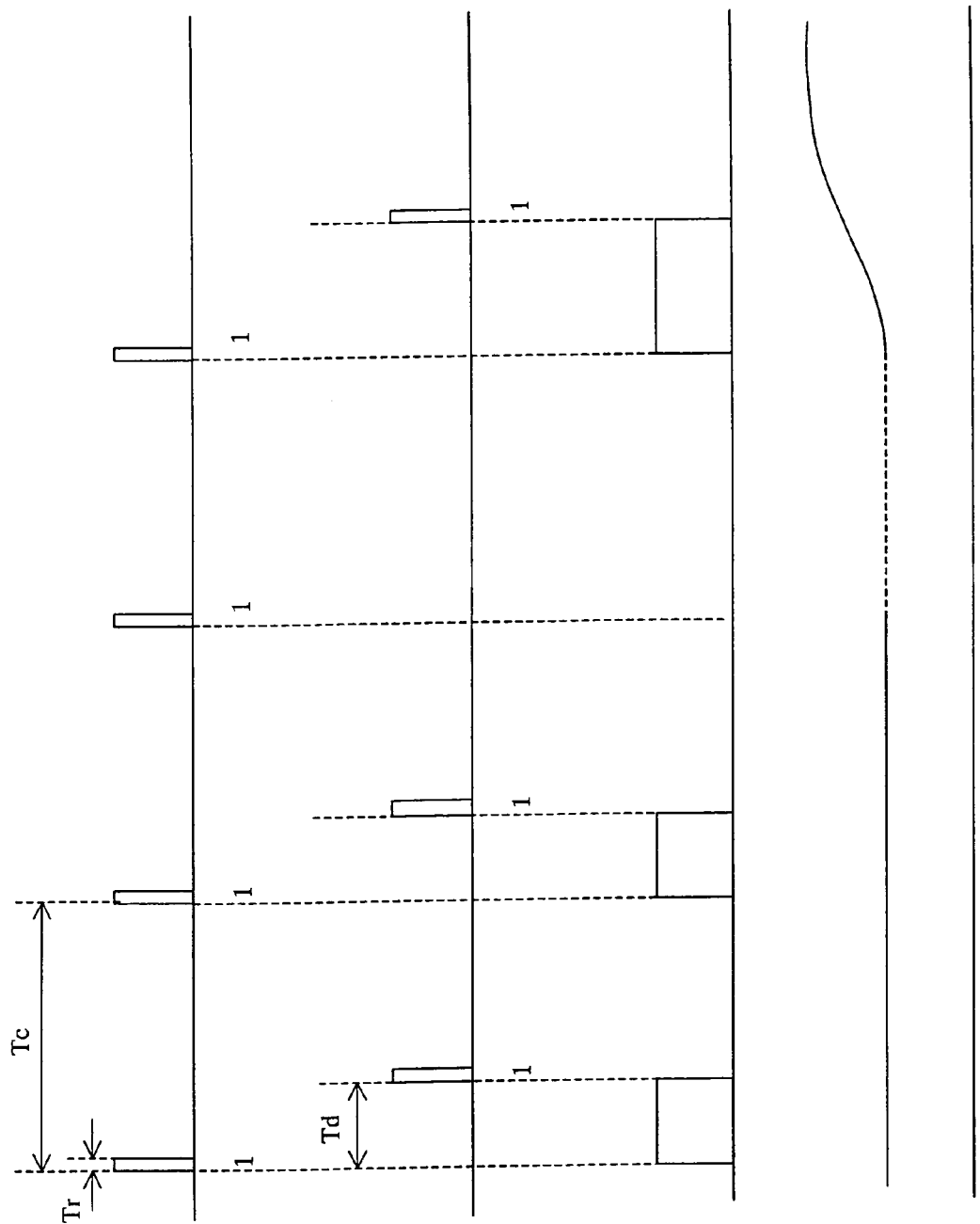

PULSE WAVE RADAR DEVICE

BACKGROUND OF THE INVENTION

1. Field of the Invention

The present invention relates to a pulse wave radar device that uses a pulse wave. More specifically, it relates to an in-vehicle pulse wave radar device that prevents mistaken measurement of a pulse wave sent from any other radar device and utilizes the pulse wave radar device to enable communication.

2. Description of the Related Art

A variety of types of pulse wave radar devices are known which measure a distance to a target based on a lapse of time that has elapsed from a moment of transmission of a pulse wave to a moment of reception of a reflection from the target. With such a pulse wave radar device, a lapse of time that has elapsed from a moment of emission of a transmitting wave to a moment of reception of a receiving wave is measured to thereby obtain a signal that is proportional to a distance from the pulse wave radar device to a target, according to which signal, the distance is calculated.

A pulse wave radar device and the like for use in weather observation aimed at long-range measurement provides an antenna itself with sharp directivity and so scarcely interferes with any other pulse wave radar device in radio communication. An in-vehicle pulse wave radar device and the like aimed at short-range measurement, on the other hand, provides it with wide directivity and so may be impossible to distinguish between a transmitting wave of its own and that of any other device in a case where a number of pulse wave radar devices are present in the same area.

Therefore, various types of radar devices have been developed to enable distinguishing between a transmitting wave of one of the devices and that of any other even if a number of pulse wave radar devices are present in the same area (see, for example, Japanese Patent Application Laid-Open No. 2002-277541).

The following will describe a conventional pulse wave radar device with reference to FIGS. 1 and 2. FIG. 1 is an explanatory block diagram of a configuration of the conventional pulse wave radar device. In FIG. 1, a reference numeral 81 indicates an information encoder for generating a code string obtained by encoding an identifier and an identification number that are used to identify a pulse wave radar device, a reference numeral 82 indicates a transmitter for phase-modulating an information pulse and transmitting it, a reference numeral 84 indicates an antenna for emitting a transmitting wave and receiving a receiving wave, a reference numeral 85 indicates a receiver for receiving a receiving wave, a reference numeral 86 indicates a phase detector for detecting a receiving wave, a reference number 87 indicates an A/D converter for digitizing detected information, and a reference numeral 88 indicates a signal processor for collating information digitized by the A/D converter with a code string obtained by encoding an identifier and an identification number by the information encoder 81 and, only if they agree, measuring a difference in time from a reference pulse to thereby calculate a distance to a target.

FIG. 2 is a timing chart of an input signal to the signal processor 88 for explaining operations of the conventional pulse wave radar device. The signal processor 88 compares between an identifier and an identification number that are received and those that are transmitted. In a case where the transmitted identifier and identification number are represented as code string "a", if the received identifier and identification number constitute the code string "a", the processor measures a delay time between the transmitted wave and the received wave, thereby calculating a distance to the target. If the received identifier and identification number constitute code string "b", the processor abandons information of the measured delay time utilizing that code string.

With such a pulse wave radar device, if a plurality of targets is present as shown in FIG. 2, receiving waves are multiplexed one on another, so that it is impossible to compare the identifier and identification number that are received with those that are transmitted. Further, the received code string is compared or correlated, so that a high-speed signal processing circuit is required, thus leading to an increase in power consumption.

SUMMARY OF THE INVENTION

To solve these problems, the present invention has been developed, and it is an object of the present invention to provide a pulse wave radar device that can distinguish between a transmitting wave of its own and that of any other device even if a number of pulse wave radar devices are present in the same area, to reduce an amount of required high-speed signal processing, thereby measuring a distance to a target accurately.

To achieve this purpose, in contrast to an ordinary pulse wave radar device that always uses as a transmitting signal a distance-measuring single pulse in each frame, a pulse wave radar device of the present invention multiplexes a distance-measuring signal and a user data signal one on the other and converts it into a single pulse in each frame to use it as a transmitting signal. That is, it multiplexes the distance-measuring signal and the user data signal one on the other and converts it into a single pulse so that each frame may have in it the single pulse serving as a transmitting signal and a distance measurement region. As a result, some of the frames have no single pulse in them.

Specifically, the present invention provides a pulse wave radar device comprising: a transmitting signal generation circuit for generating a transmitting signal in which a distance-measuring signal and a user data signal are multiplexed one on the other; an RZ code conversion circuit for generating an RZ propagation signal obtained by RZ-converting the transmitting signal from this transmitting signal generation circuit into a return-to-zero (RZ) code having a predetermined pulse width; a transmitting circuit for transmitting a transmitting wave obtained by intensity-modulating the RZ propagation signal from this RZ code conversion circuit at a local oscillation frequency; a transmitting antenna for emitting the transmitting wave sent from this transmitting circuit; a receiving antenna for receiving a receiving wave reflected by a target; and a receiving circuit for intensity-demodulating the receiving wave into the RZ propagation signal by detecting the receiving wave from this receiving antenna.

According to the present invention, it is possible to utilize a pulse wave radar device not only for measurement of just a reciprocating propagation time but also for communication as well as prevention of radio interference with any other pulse wave radar devices.

The pulse wave radar device according to the present invention may further comprise a signal separation circuit for taking out an RZ propagation signal from the receiving circuit by separating it into the distance-measuring signal and the user data signal from each other.

According to the present invention, it is possible to measure a reciprocating propagation time by utilizing a distance-measuring signal and prevent radio interference with any other pulse wave radar devices by utilizing a user data signal.

The pulse wave radar device of the present invention may further comprise a time calculation circuit for detecting a lapse of time that has elapsed from a moment of emission of the transmitting wave to reception of the receiving wave to thereby calculate a reciprocating propagation time to a target.

The present invention enables this pulse wave radar device to calculate a reciprocating propagation time to a target.

In a pulse wave radar device of the present invention, the user data signal may further include identification data for identifying this pulse wave radar device.

The present invention enables preventing radio interference with any other pulse wave radar devices by utilizing the identification data.

The pulse wave radar device may further comprise a determination circuit for deciding a reciprocating propagation time calculated by the time calculation circuit to be valid if identification data separated by the signal separation circuit coincides with identification data multiplexed by the transmitting signal generation circuit.

The present invention enables preventing a reciprocating propagation time calculated by the time calculation circuit from becoming indeterminate owing to determination of non-coincidence by the determination circuit.

In the pulse wave radar device of the present invention, if the determination circuits determines non-coincidence between identification data separated by the signal separation circuit and identification data multiplexed by the transmitting signal generation circuit, the time calculation circuit may hold a reciprocating propagation time determined before by the determination circuit to be valid because of coincidence.

According to the present invention, even if radio interference occurs with this pulse wave radar device, it is possible to operate this pulse wave radar device stably without measuring a reciprocating propagation time based on wrong information.

In a pulse wave radar device of the present invention, the user data signal may include communication information to be sent out of this pulse wave radar device.

The present invention enables utilizing this pulse wave radar device as a transmitter for communication.

In the pulse wave radar device of the present invention, a clock signal for a transmitting signal generated by the transmitting signal generation circuit may have a clock cycle of 10 MHz or less.

The present invention enables detecting a maximum distance of up to 16 m or more from the pulse wave radar device to a target.

In the pulse wave radar device of the present invention, a code included in an RZ propagation signal generated by the RZ code conversion circuit may have a pulse width of 2 nsec or less.

The present invention enables detecting a minimum distance of 30 cm or less from the pulse wave radar device to a target.

Even if a number of pulse wave radar devices are present in the same area, a pulse wave radar device according to the present invention can distinguish between a transmitting signal of its own and that of any other to thus reduce an amount of required high-speed signal processing, thus measuring a distance to a target accurately.

BRIEF DESCRIPTION OF THE DRAWINGS

FIGS. 4A through 4D is an explanatory timing chart of operations of the pulse wave radar device according to the present embodiment;

FIGS. 9A through 9D is an explanatory timing chart of operations of the time calculation circuit in the pulse wave radar device according to the present embodiment.

DESCRIPTION OF THE PREFERRED EMBODIMENTS

First Embodiment

The present embodiment provides a pulse wave radar device for transmitting a distance-measuring signal and a user data signal. Specifically, this pulse wave radar device transmits in a form of a transmitting wave a transmitting signal, as RZ-converted, which is obtained by adding identification data as a user data signal to a distance-measuring signal and receives a receiving wave obtained when the transmitting wave is reflected by a target, thus measuring a reciprocating propagation time to the target. Even if the transmitting wave or the receiving wave obtained when the transmitting wave is reflected by the target is received by any other pulse wave radar device in that while, this pulse wave radar device can detect identification data from the received wave to determine that it is not a receiving wave obtained when a transmitting wave of its own is reflected by the target, so that it is possible to prevent measurement of wrong distance to the target.

Further, if a transmitting signal to which communication information is added is transmitted as a user data signal in a form of a transmitting wave, it is possible to communicate with other devices by receiving a user data signal.

Figure 1:
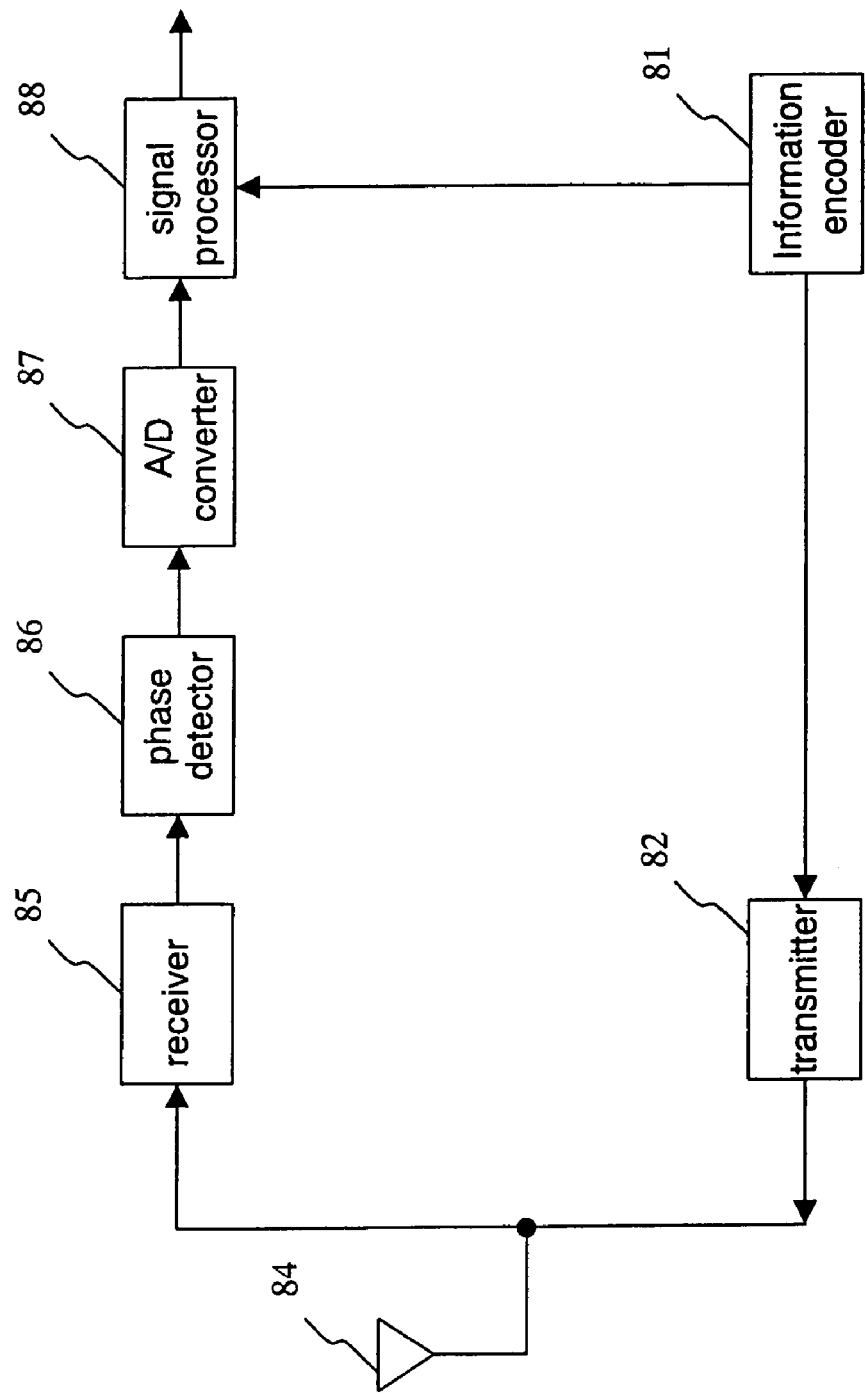
FIG. 1 is an explanatory block diagram of a configuration of a conventional pulse wave radar device.
Figure 2:
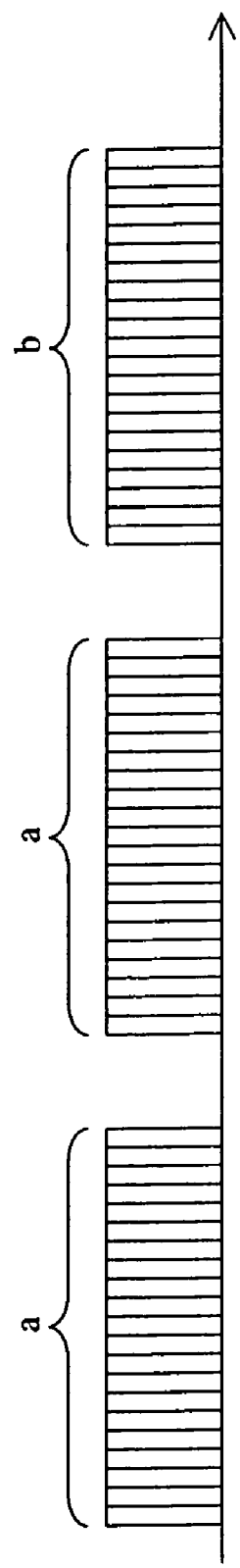
FIG. 2 is an explanatory timing chart of operations of the conventional pulse wave radar device.
Figure 3:
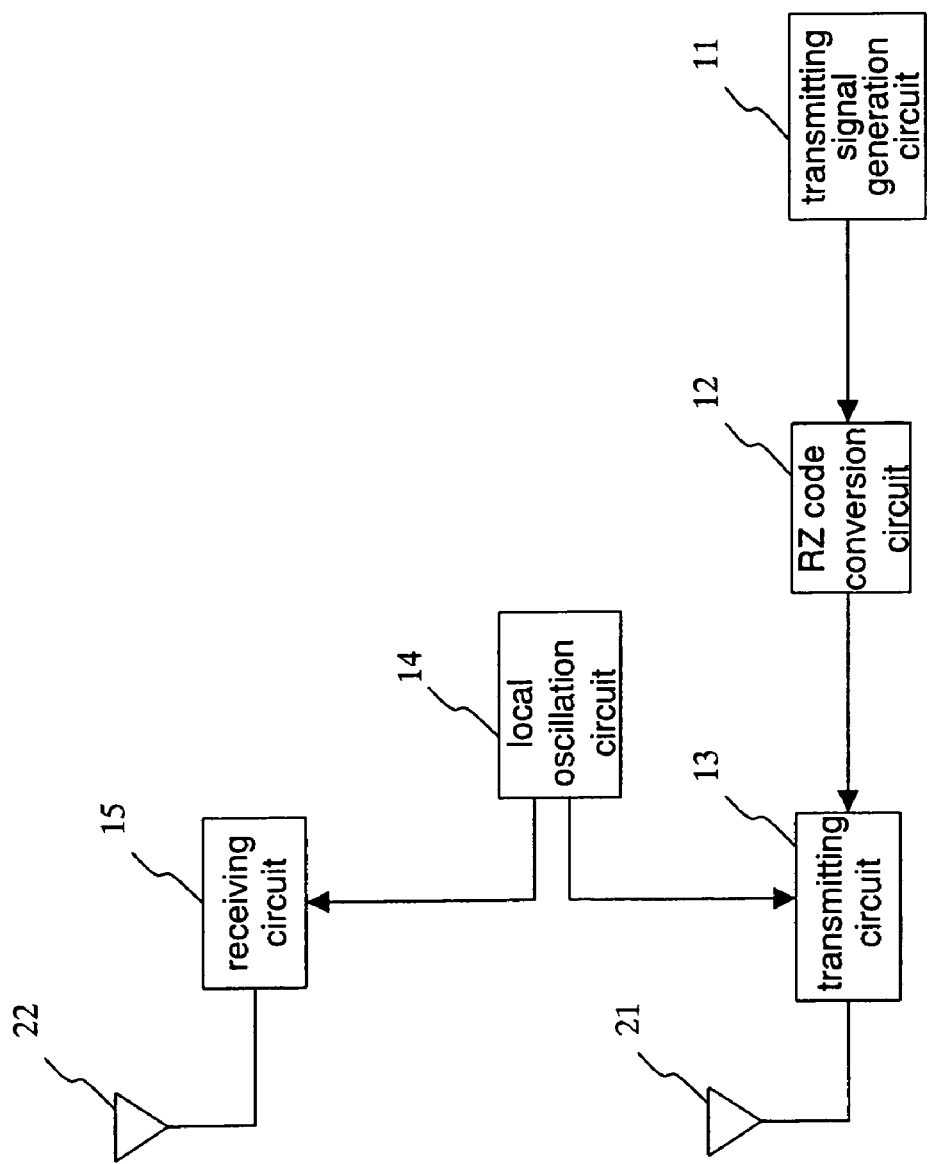
FIG. 3 is an explanatory block diagram of an outlined configuration of a pulse wave radar device according to the present embodiment.

The following will describe the pulse wave radar device according to the present embodiment with reference to FIGS. 3 and 4. FIG. 3 is an explanatory block diagram of an outlined configuration of the pulse wave radar device according to the present embodiment, in which a reference numeral 11 indicates a transmitting signal generation circuit for generating a transmitting signal obtained by adding identification data as the user data signal to the distance-measuring signal, a reference numeral 12 indicates an RZ code conversion circuit for generating an RZ propagation signal obtained by RZ-converting the transmitting signal into an RZ code having a predetermined pulse width, a reference numeral 13 indicates a transmitting circuit for transmitting a transmitting wave obtained by intensity-modulating the RZ propagation signal at a local oscillation frequency, a reference numeral 14 indicates a local oscillation circuit, a reference numeral 15 indicates a receiving circuit for detecting the receiving wave to intensity-demodulate into the RZ propagation signal, a reference numeral 21 indicates a transmitting antenna for emitting the transmitting wave, and a reference numeral 22 indicates a receiving antenna for receiving the receiving wave.

In contrast to an ordinary radar device for transmitting one pulse code at a constant period always, a pulse wave radar device according to the present embodiment transmits at a constant period a transmitting signal obtained by adding identification data for identifying pulse wave radar devices to a distance-measuring signal so that any other pulse wave radar device can identify a receiving wave obtained when a transmitting wave of its own is reflected by a target. In FIG. 3, the transmitting signal generation circuit 11 generates as a transmitting signal a distance-measuring signal and identification data as a user data signal of its own. The identification data may be fixed data such as an identification number unique to the pulse wave radar device, an identification number set to a key of a vehicle in a case where the device is to be mounted in the vehicle, or an identification number set to a vehicle or such data as to be changed when the pulse wave radar device is mounted or an engine is started by utilizing an M-sequence code (maximum length linear shift register sequence code), a gold code, a Barker code, etc.

A transmitting signal from the transmitting signal generation circuit 11 is output to the RZ code conversion circuit 12. The RZ code conversion circuit 12 RZ-converts each of codes of the transmitting signal into an RZ code having a predetermined pulse width. The RZ code conversion circuit 12 outputs an RZ propagation signal thus RZ-converted, to the transmitting circuit 13. The transmitting circuit 13 intensity-modulates the RZ-converted RZ propagation signal at a local oscillation frequency from the local oscillation circuit 14 and emits it as a pulse code through the transmitting antenna 21.

A receiving signal reflected by the target is received at the receiving antenna 22 and amplified by a low-noise amplifier in the receiving circuit 15, to then intensity-demodulate into the RZ propagation signal reflected by the target at the local oscillation frequency from the local oscillation circuit 14. If necessary, this pulse wave radar device may be provided with a time calculation circuit for detecting a lapse of time that has elapsed from a moment of transmission of the RZ propagation signal to a moment of its reception to thereby calculate a reciprocating propagation time to the target. From the reciprocating propagation time, a distance to the target can be calculated.

Even if the same receiving wave is received by any other pulse wave radar device in that while, it can detect identification data included in the intensity-demodulated into RZ propagation to determine whether it coincides with identification data itself has sent. If non-coincidence is determined, the pulse wave radar device stops calculation of the reciprocating propagation time or abandons its calculated value to prevent calculation of a wrong distance to the target.

Although the transmitting antenna 21 and the receiving antenna 22 are illustrated as separated in FIG. 3, they may be combined into one antenna for transmission and reception. Further, if the antenna has directivity, a reciprocating propagation time to the target in a specific direction can be calculated and if it has a wide directivity, a reciprocating propagation time to the target over a wide angle can be calculated. The antenna can be mounted anywhere. If it is to be mounted in a vehicle, it is equipped in a front bumper, in an engine room or in front of a driver's seat. This holds true also with the following embodiments.

Figures 4A, 4B, 4C, 4D:
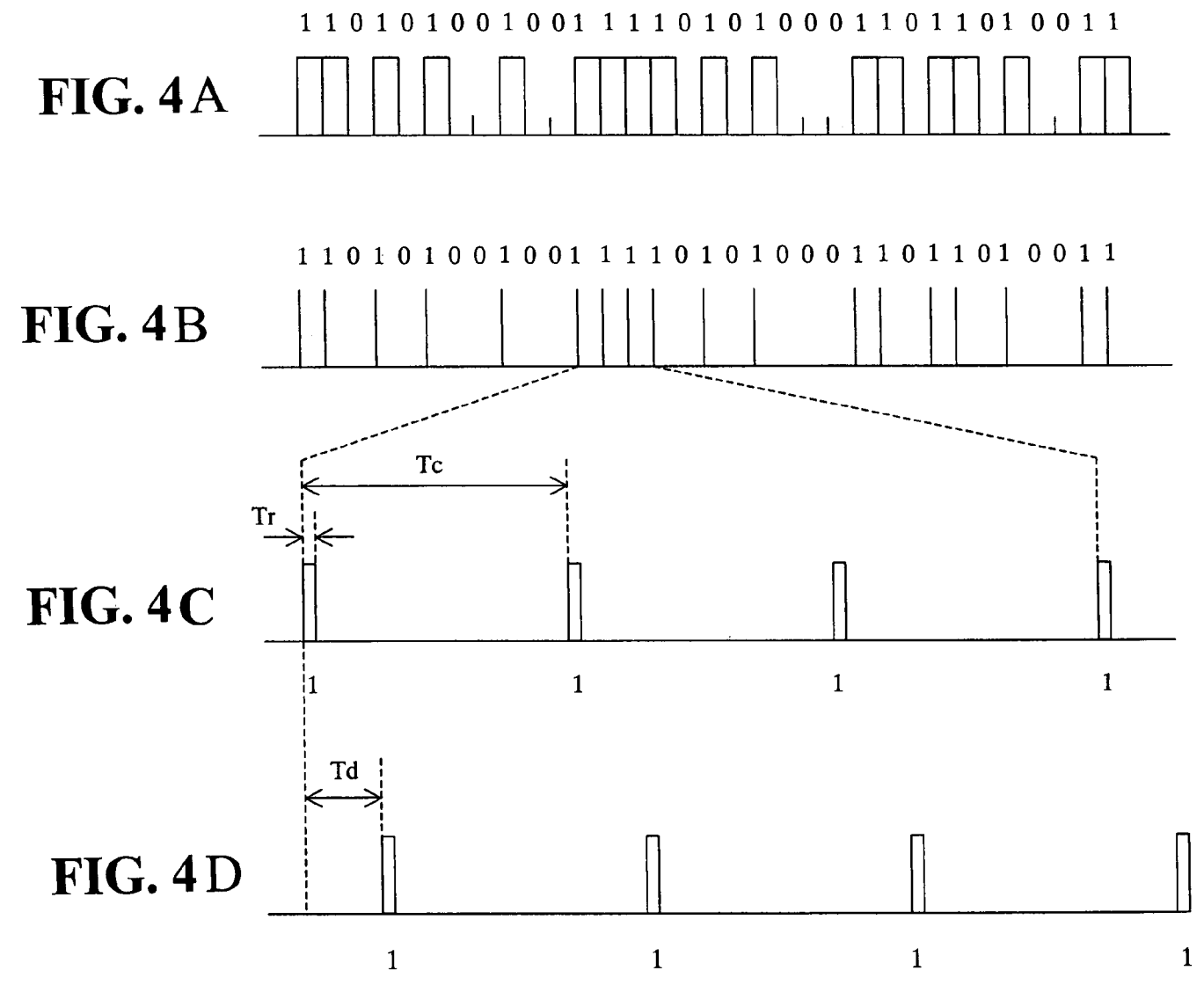

FIG. 4 is an explanatory timing chart of operations of the pulse wave radar device according to the present embodiment. FIG. 4A indicates a timing chart of operations of a transmitting signal generated by the transmitting signal generation circuit. In the chart, a sequential code string starting with "11010100100" is exemplified. For example, as shown in FIG. 4, eleven codes of "11010100100" are utilized as identification data and the following four codes of "1111" are utilized for measuring the distance.

FIG. 4B indicates a timing chart of operations of an RZ propagation signal obtained by RZ-converting the transmitting signal shown in FIG. 4A by the RZ code conversion circuit. FIG. 4C expands a portion of a sequential distance-measuring signal of FIG. 4B. In it, Tc indicates a clock signal period of the transmitting signal and Tr indicates a pulse width of a code of the RZ propagation signal. As such, the RZ code conversion circuit outputs the RZ propagation signal having a pulse width Tr at clock signal period Tc.

FIG. 4D expands a portion of a sequential distance-measuring signal, which is the RZ propagation signal intensity-demodulated by the receiving circuit. As can be seen in it, delay time difference Td has occurred between a pulse of the sequential distance-measuring signal of FIG. 4C and that of the sequential distance-measuring signal of FIG. 4D. It means that the target is distant by as much as a distance that corresponds to the delay time difference Td.

Even in a case where a receiving wave including "11010100100" as identification data is received by any other pulse wave radar device, if it detects the identification data included in it and determines its non-coincidence with identification data itself has sent, it stops calculation of a reciprocating propagation time by use of the following distance-measuring signal "1111" or abandons its calculated value. Through such operations, a wrong distance to the target is prevented from being calculated.

In place of or in addition to the identification data, communication information may be included as a user data signal in a transmitting signal. Communication information for transfer of communication information is input to the transmitting signal generation circuit 11 in FIG. 3 and, following transmission of the distance-measuring signal "1111", the communication information '010100011011010011' is transmitted in FIG. 4A. Such communication information may be a CAN BUS signal. By including such communication information in a transmitting signal, the pulse wave radar device can be utilized also as a device for transmitting communication information. By including both identification data and communication information in a transmitting signal and using the identification data to identify a pulse wave radar device or a vehicle, it can be transmitted as communication information to which information of a sender is added.

A range indicated by clock signal period Tc in FIG. 4C is referred to as a frame. At the beginning of a frame, each of pulses of an RZ propagation signal is allocated which is obtained by RZ-converting a transmitting signal including identification data and a distance-measuring signal by the RZ code conversion circuit. Therefore, "1" is not always allocated at the beginning of each frame.

Although in the present embodiment each frame has comprised the beginning eleven pulses as identification data, followed by four pulses as a distance-measuring signal and eighteen pulses as communication information in this order, the present invention is not limited to it. If the identification data has more pulses, identification is improved correspondingly. If the distance-measuring signal has more pulses, a measurement accuracy of a reciprocating propagation time is increased correspondingly. If the communication information has more pulses, a transmission speed is increased correspondingly. Further, although the present embodiment has allocated identification data, a distance-measuring signal, and communication information in a concentrated manner, they may be dispersed from each other in allocation. Furthermore, the distance-measuring signal may be utilized as a synchronizing header for the identification data or the communication information.

Second Embodiment

Figure 5:
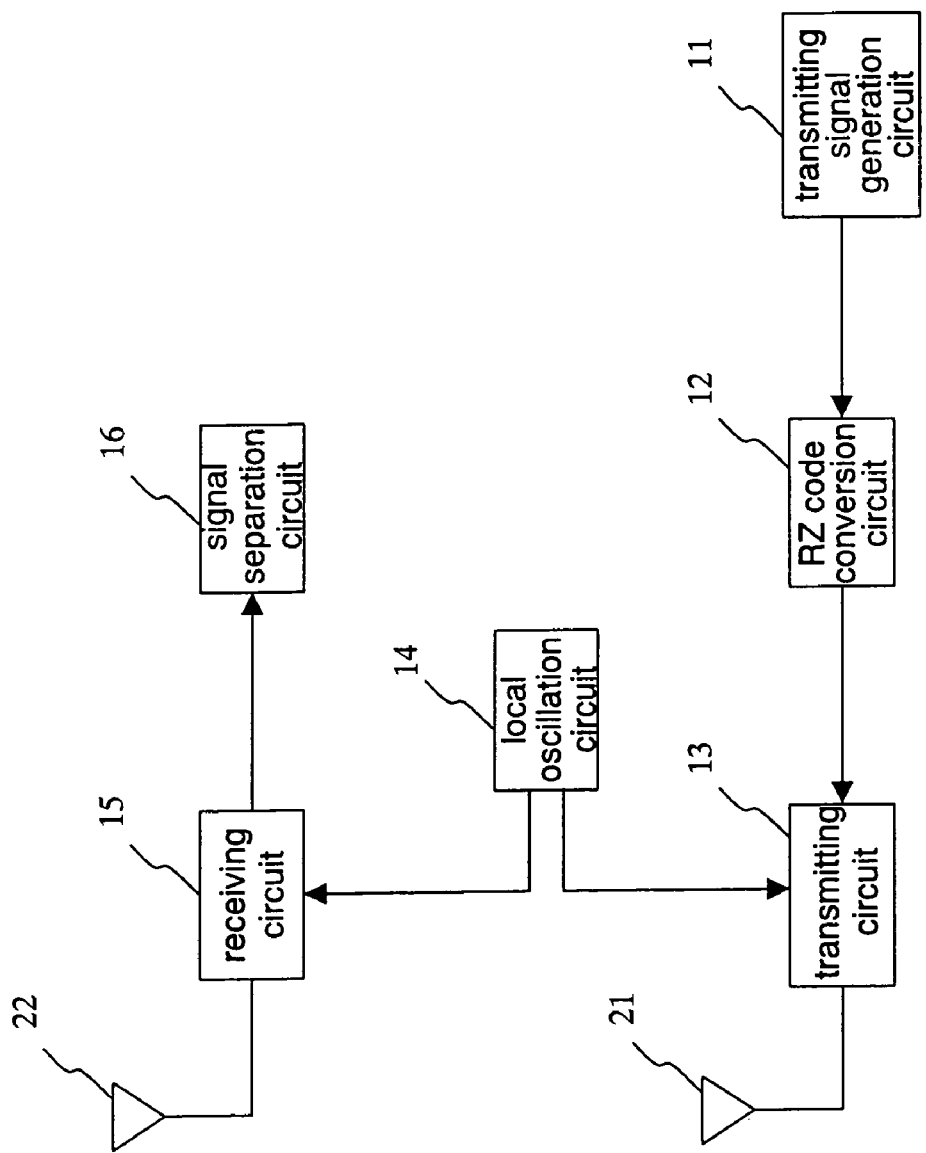
FIG. 5 is an explanatory block diagram of an outlined configuration of a pulse wave radar device according to another embodiment.

FIG. 5 shows another embodiment of a pulse wave radar device. Components that are the same as or correspond to those of FIG. 3 are indicated by the same reference symbols and so their description is omitted. This pulse wave radar device is different from that shown in FIG. 3 in that it is provided with a signal separation circuit 16.

The signal separation circuit 16 takes out a distance-measuring signal and a user data signal by separating them from an RZ propagation signal which is intensity-demodulated by a receiving circuit 15. By utilizing the distance-measuring signal, it is possible to measure a reciprocating propagation time to a target. Further, if identification data is included in the user data signal, it can determine whether identification data which itself has sent coincides that included in the RZ propagation signal which is intensity-demodulated.

Third Embodiment

Figure 6:
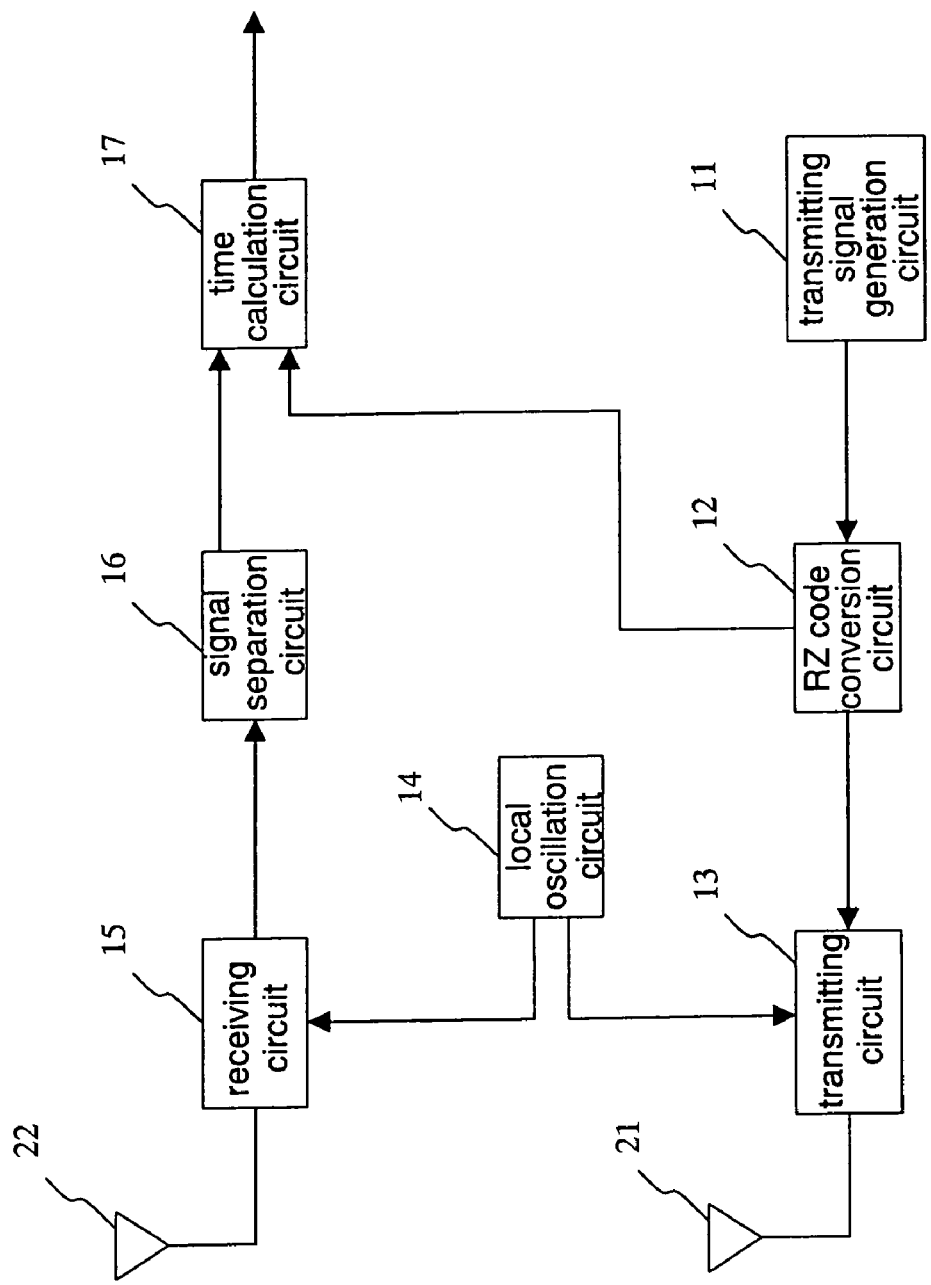
FIG. 6 is an explanatory block diagram of an outlined configuration of a pulse wave radar device according to a further embodiment.

FIG. 6 shows a further embodiment of a pulse wave radar device. Components that are the same as or correspond to those of FIG. 5 are indicated by the same reference symbols and so their description is omitted. This pulse wave radar device is different from that shown in FIG. 5 in that it is provided with a time calculation circuit 17.

The time calculation circuit 17 detects a lapse of time that has elapsed from a moment of emission of a transmitting wave by the pulse wave radar device to a moment of reception of a receiving wave to thereby calculate a reciprocating propagation time to a target. In FIG. 6, the time calculation circuit 17 detects a lapse of time that has elapsed from a moment when an RZ code conversion circuit 12 output an RZ propagation signal through moments when a transmitting circuit 13 transmitted a transmitting wave obtained by intensity-modulating the RZ propagation signal from the RZ code conversion circuit 12 at a local oscillation frequency, the transmitting wave from the transmitting circuit 13 was radiated from a transmitting antenna 21, a receiving wave reflected by the target was received at a receiving antenna 22, the receiving wave from the receiving antenna 22 was detected by a receiving circuit 15 to intensity-demodulate into the RZ propagation signal, and a distance-measuring signal and a user data signal were taken out after being separated from the RZ propagation signal intensity-demodulated by the signal separation circuit 16 to a moment when the RZ propagation signal was input from the signal separation circuit 16 to the time calculation circuit 17, thus calculating a reciprocating propagation time to the target. A distance to the target can be calculated from the reciprocating propagation time.

A distance L (m) to the target can be given by the following Equation (1):

$$L = Td \cdot C/2 \qquad (1)$$

where Td (sec) indicates a lapse of time that has elapsed from a moment of emission of a transmitting wave by the pulse wave radar device to a moment of reception of a receiving wave and C (m/sec) indicates the light speed. As indicated by it, the pulse wave radar device performs a division by use of 2 in order to detect a reciprocating propagation time to the target. Preferably, the time calculation circuit 17 measures propagation delay times through various circuits in the pulse wave radar device beforehand and converts a detected time into a lapse of time that has elapsed from a moment of emission of a transmitting wave by the pulse wave radar device to a moment of reception of a receiving wave, thereby calculating a reciprocating propagation time to the target.

Time difference Td has occurred between a pulse of an RZ propagation signal output by the RZ code conversion circuit 12 of FIG. 4C and that of the RZ propagation signal input from the signal separation circuit 16 to the time calculation circuit 17 of FIG. 4D. It means that the target is distant by as much as a distance that corresponds to the time difference Td. The distance to the target can be calculated from Equation (1).

The time calculation circuit can employ a pulse count system or a flip-flop circuit system. According to the pulse count system, a moment when a distance-measuring signal is output by the RZ code conversion circuit 12 is assumed to be a start timing and a moment when the distance-measuring signal is output by the signal separation circuit 16 is assumed to be a stop timing, to detect the number of pulses counted between these two timings, thus calculating a lapse of time.

Figure 7:
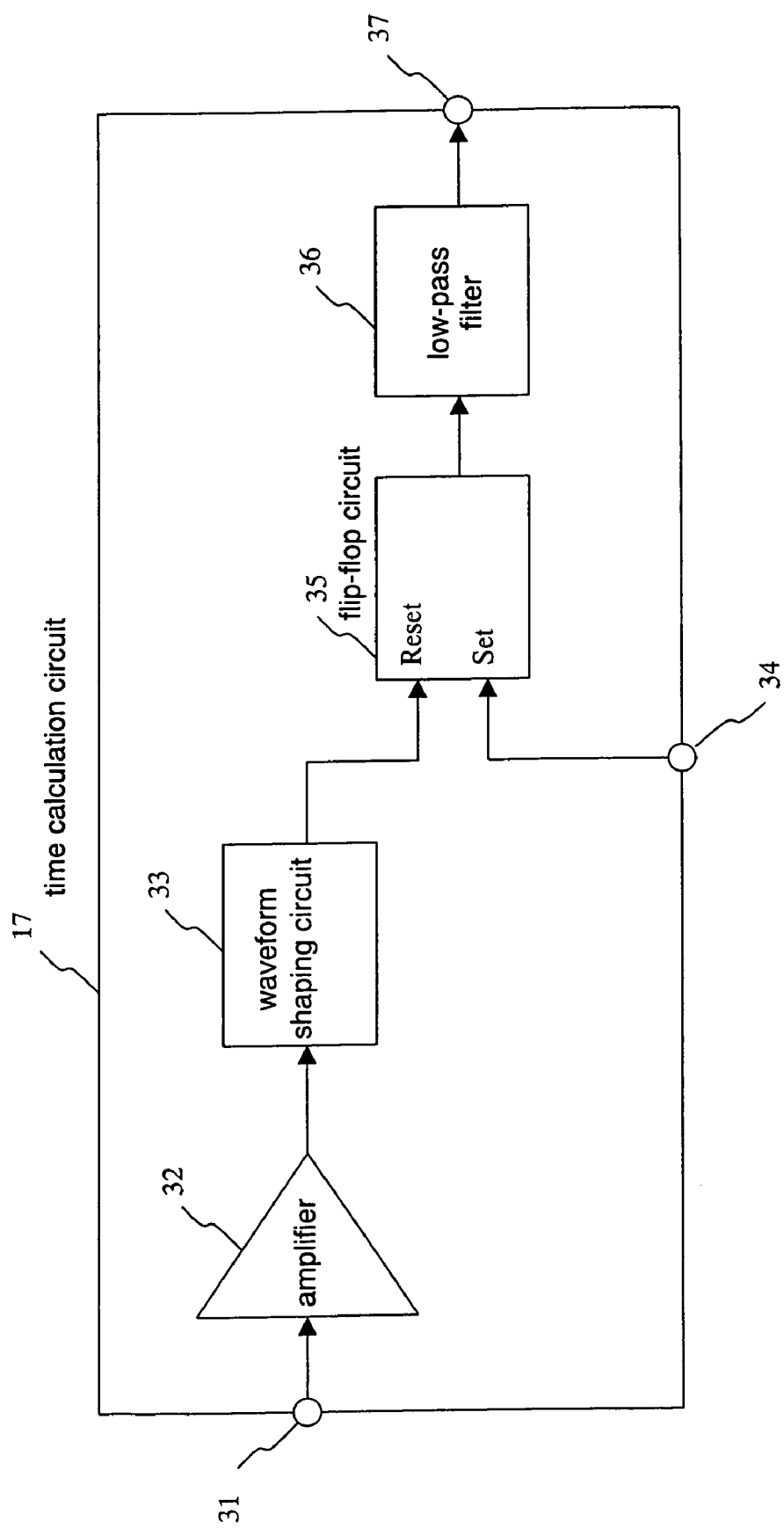
FIG. 7 is an explanatory block diagram of part of a configuration of a time calculation circuit in the pulse wave radar device of the present embodiment.

FIG. 7 shows part of a configuration of the time calculation circuit 17 shown in FIG. 6 as an example of the flip-flop circuit system. In FIG. 7, a reference numeral 17 indicates the time calculation circuit, a reference numeral 31 indicates an input terminal, a reference numeral 32 indicates an amplifier, a reference numeral 33 indicates a waveform shaping circuit, a reference numeral 34 indicates another input terminal, a reference numeral 35 indicates a flip-flop circuit, a reference numeral 36 indicates a low-pass filter, and a reference numeral 37 indicates an output terminal. An output of the signal separation circuit is input to the input terminal 31, is amplified by the amplifier 32, and then has its waveform shaped by the waveform shaping circuit 33. Preferably the flip-flop circuit 35 is of a set/reset type. A signal from the RZ code conversion circuit is input from the input terminal 34 to a SET terminal of the flip-flop circuit 35. A signal from the waveform shaping circuit 33 is input to a RESET terminal of the flip-flop circuit 35. If a time necessary for a pulse code to go to the target and return back is short, a time that elapses from a moment when the flip-flop circuit 35 is set to a moment when it is reset is short, whereas if the time for the pulse code to go to the target and return back is long, the time that elapses from the moment when the flip-flop circuit 35 is set to the moment when it is reset is long, so that when an output of this flip-flop circuit 35 is smoothed by the low-pass filter 36, a DC level that corresponds to the time necessary for the pulse code to go to the target and return back appears at the output terminal 37.

Note here that if there are two targets, two of the pulses, such as shown in FIG. 4D, of the RZ propagation signal input from the receiving circuit to the time calculation circuit 17 exist in each frame. In the case of the flip-flop circuit system, according to which the pulse is input twice to the RESET terminal of the flip-flop circuit 35, the second inputting does not trigger the flip-flop circuit 35 to operate. Therefore, only a propagation delay time to the nearer one of the targets is measured, having no influence on the system as a whole. Although the pulse count system also gives two stop timings, pulse counting is stopped already, so that only a propagation delay time to the nearer one of the targets is measured, having no influence on the system as a whole. Similarly, in the case of any other systems also, unless the second pulse of the RZ propagation signal which is intensity-demodulated by the receiving circuit triggers the circuit to operate, only a propagation delay time to the nearer one of the targets is measured, having no influence on the system as a whole.

Preferably, the clock cycle Tp is 10 MHz or less. Assuming a maximum detectable distance from the pulse wave radar device to the target to be 16 m, if a pulse code is transmitted before a preceding one is transmitted, reflected by the target placed at a distance of 16 m, and returned back, the target positioned at the maximum detectable distance cannot be detected. When the target is positioned at the maximum detectable distance of 16 m, the time necessary for the pulse code to go to the target and return back is 106 nsec. A clock signal having a period of 106 nsec has a clock signal frequency of 9.4 MHz. Therefore, if the clock cycle for a transmitting signal is 10 MHz or less, a maximum detectable distance of 16 m or more can be assured.

Preferably, the pulse width Tr of a code of the RZ propagation signal is 2 nsec or less. Assuming a minimum detectable distance from the pulse wave radar device to the target to be 30 cm, if transmission of one pulse code is not completed before it is transmitted, reflected by the target positioned at a distance of 30 cm, and returned back, the target at the minimum detectable distance cannot be detected. If the minimum detectable distance is 30 cm, the time necessary for the pulse code to go to the target and return back is 2 nsec. Therefore, if the pulse width of the code of the RZ propagation signal is 2 nsec or less, a minimum detectable distance of 30 cm or less can be assured.

Fourth Embodiment

Figure 8:
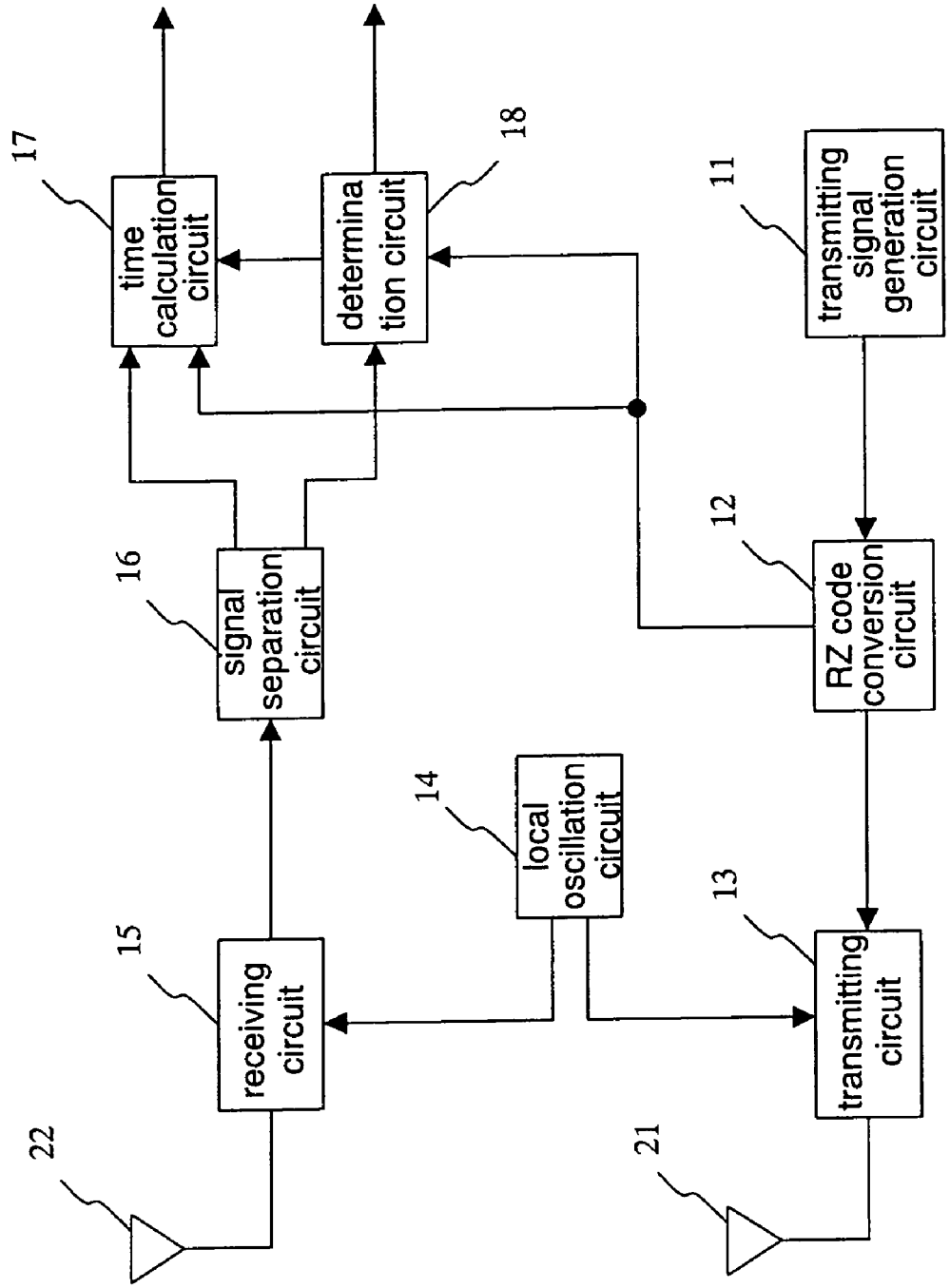
FIG. 8 is an explanatory block diagram of an outlined configuration of a pulse wave radar device according to a still further embodiment.

FIG. 8 shows a still further embodiment of a pulse wave radar device. Components that are the same as or correspond to those of FIG. 6 are indicated by the same reference symbols and so their description is omitted. This pulse wave radar device is different from that shown in FIG. 6 in that it is provided with a determination circuit 18. The determination circuit 18 receives, from an RZ code conversion circuit 12, identification data transmitted by itself and further receives from a signal separation circuit 16 identification data included in an RZ propagation signal which is intensity-demodulated, thereby detecting coincidence or non-coincidence between the identification data transmitted by itself and that included in the intensity-demodulated RZ propagation signal.

According to the present embodiment, by collating received identification data with that which itself has transmitted to thereby measure a reciprocating propagation time of the distance-measuring signal, the radar device can distinguish between a reflected wave which itself has transmitted and a transmitting wave which any other radar device has transmitted or a reflected wave owing to this transmitting wave. For example, if the identification data that itself has transmitted is "11010100100" shown in FIG. 4B and identification data included in an RZ propagation signal intensity-demodulated by the receiving circuit is the same as that, it can be determined to be the identification data that itself has transmitted. If it is any other identification data, it is determined to be a transmitting wave from any other radar device or a reflected wave owing to this transmitting wave. By making a determination in such a manner, it is possible to distinguish its own transmitting wave from that transmitted by a conventional pulse wave radar device and, further, easily determine a reflected pulse owing to a pulse code of identification data that itself has transmitted even if any other pulse wave radar device would transmit identification data.

If the determination circuit 18 determines coincidence between identification data separated by the signal separation circuit 16 and that which is multiplexed by the transmitting signal generation circuit 11, it determines a reciprocating propagation time calculated by the time calculation circuit 17 to be valid by using the distance-measuring signal included in a relevant RZ propagation signal.

The determination circuit 18 might as well make a determination based on complete coincidence between identification data separated by the signal separation circuit 16 and that multiplexed by the transmitting signal generation circuit 11. A determination may be made on the basis of coincidence within a tolerance taking into account an error of the receiving circuit. That is, the tolerance may be of a degree at which a correlation is detected. The cases of deciding a low correlation include a case other than complete coincidence.

If the determination circuit 18 determines that a correlation is low, preferably the time calculation circuit 17 sustains a reciprocating propagation time calculated before because of a high correlation. It is thus possible to prevent a reciprocating propagation time calculated by the time calculation circuit 17 from becoming indeterminate owing to a determination of a low correlation.

FIG. 9 explains a timing chart of operations of the determination circuit 18 when it determines non-coincidence between identification data separated by the signal separation circuit 16 and that multiplexed by the transmitting signal generation circuit 11 in the case of a flip-flop circuit system. It is to be noted that in this example, the distance-measuring signal shown in FIG. 4A is included in the identification data and this sequence of data pieces is used as the identification data to detect whether they coincide or not. FIG. 9A expands a portion of a sequential distance-measuring signal. In it, Tc indicates a clock signal period of the transmitting signal and Tr indicates a pulse width of a code of the RZ propagation signal. FIG. 9B expands a portion of a sequential distance-measuring signal, which is the RZ propagation signal that is intensity-demodulated by the receiving circuit. FIG. 9C shows an output of a flip-flop circuit 35 shown in FIG. 7 and FIG. 9D shows an output of a low-pass filter 36 shown in FIG. 7.

If the determination circuit 18 determines in a third period of FIG. 9B that identification data separated by the signal separation circuit 16 from the RZ propagation signal intensity-demodulated by a receiving circuit 15 does not coincide with that multiplexed by the transmitting signal generation circuit 11, the device stops operations of the flip-flop circuit 35 or charging/discharging of the low-pass filter 36 and the time calculation circuit 17 sustains a reciprocating propagation time determined by the determination circuit 18 to be valid because of coincidence before. In FIG. 9D, the same output is sustained as indicated by a dotted line portion.

Through such operations, even if radio interference has occurred on the present pulse wave radar device, it can measure a reciprocating propagation time stably without measuring it based on wrong information. Further, although the present embodiment has exemplified a case where the distance-measuring signal is included in identification data, the determination circuit 18 may detect coincidence/non-coincidence based on only identification data. In this case, after the determination circuit 18 determines non-coincidence, the time calculation circuit 17 may sustain and output a reciprocating propagation time determined to be valid by the determination circuit 18 before.

Although the circuits that handle the RZ propagation signal, the transmitting wave, and the receiving wave in the pulse wave radar device shown in FIG. 8 operate at a high speed, the other circuits operate at a relatively low speed, thus enabling suppressing power consumption to a low level.

With such a pulse wave radar device, it is possible to perform operations on an output result of the time calculation circuit 17 so that an operation result may be displayed to a driver's seat as a distance to the target. Further, it is possible to display a warning or raise an alarm to the driver if a following distance becomes less than a certain value. Furthermore, it is possible to apply the brake as coupled with a brake control circuit or sustain the following distance while the device is coupled with an automatic cruise control circuit.

In a case where identification data pieces are dispersed in allocation, if a correlation is determined to be low while it is being detected, preferably operations of the time calculation circuit 17 are stopped or sustained to start an operation of the time calculation circuit 17 and generation of the identification data from an initial state. By providing the next detection state early, it is possible to calculate a distance to the target efficiently.

The pulse wave radar device according to the present invention can be utilized not only as an in-vehicle one but also as a fixed type one where a plurality of pulse wave radar devices is used simultaneously.

What is claimed is:

1. A pulse wave radar device comprising:
   a transmitting signal generation circuit for generating a transmitting signal in which a distance-measuring signal and a user data signal are multiplexed one on the other;
   an RZ code conversion circuit for generating an RZ propagation signal obtained by RZ-converting the transmitting signal from the transmitting signal generation circuit into a RZ code having a predetermined pulse width;
   a transmitting circuit for transmitting a transmitting wave obtained by intensity-modulating the RZ propagation signal from the RZ code conversion circuit at a local oscillation frequency;
   a transmitting antenna for emitting the transmitting wave sent from the transmitting circuit;
   a receiving antenna for receiving a receiving wave reflected by a target; and
   a receiving circuit for intensity-demodulating the receiving wave into RZ propagation signal by detecting the receiving wave from the receiving antenna.

2. The pulse wave radar device according to claim 1, further comprising a signal separation circuit for separating the RZ propagation signal from the receiving circuit into the distance-measuring signal and the user data signal.

3. The pulse wave radar device according to claim 1 or 2, further comprising a time calculation circuit for detecting a lapse of time that has elapsed from a moment of emission of the transmitting wave to a moment of reception of the receiving signal to thereby calculate a reciprocating propagation time to the target.

4. The pulse wave radar device according to claim 1 or 2, wherein the user data signal includes identification data for identifying the pulse wave radar device.

5. The pulse wave radar device according to claim 4, further comprising a determination circuit for deciding a reciprocating propagation time calculated by the time calculation circuit to be valid if identification data separated by the signal separation circuit coincides with identification data multiplexed by the transmitting signal generation circuit.

6. The pulse wave radar device according to claim 5, wherein if the determination circuit determines that identification data separated by the signal separation circuit does not coincide with identification data multiplexed by the transmitting signal generation circuit, the time calculation circuit sustains a reciprocating propagation time determined by the determination circuit to be valid because of coincidence before.

7. The pulse wave radar device according to claim 1 or 2, wherein the user data signal includes communication information to be transferred to an outside of the pulse wave radar device.

8. The pulse wave radar device according to claim 1 or 2, wherein a clock cycle of a transmitting signal transmitted by the transmitting signal generation circuit is 10 MHz or less.

9. The pulse wave radar device according to claim 1 or 2, wherein a pulse width of a code of an RZ propagation signal generated by the RZ code conversion circuit is 2 nsec or less.

* * * * *